Sept. 2, 1958     J. L. BOICEY ET AL     2,850,409
METHOD OF DELETING ELECTRICALLY CONDUCTIVE FILMS FROM A SURFACE
Filed April 25, 1955
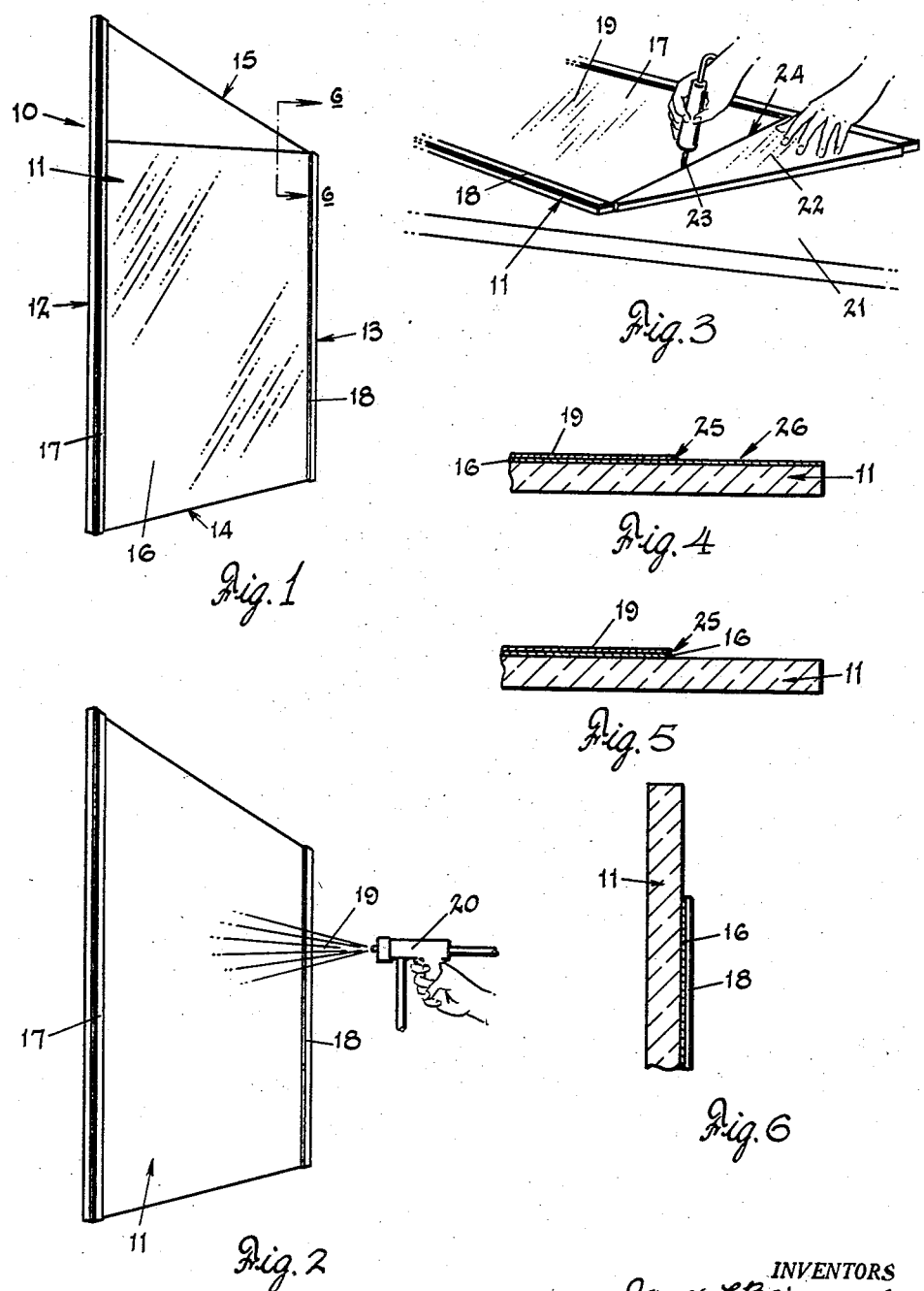
INVENTORS
James L. Boicey and
Robert P. Roetter
BY Nobbe & Swope
ATTORNEYS

United States Patent Office 2,850,409
Patented Sept. 2, 1958

2,850,409

METHOD OF DELETING ELECTRICALLY CONDUCTIVE FILMS FROM A SURFACE

James L. Boicey, Toledo, and Robert P. Roetter, Perrysburg, Ohio, assignors to Libbey-Owens-Ford Glass Company, Toledo, Ohio, a corporation of Ohio Application April 25, 1955, Serial No. 503,571

10 Claims. (Cl. 117—211)

This invention relates to articles provided with electrically conducting films, and more particularly to a novel method of protecting and locating electrically conducting films over exact area contours on selected portions of such articles during their fabrication.

Although the invention is not restricted to any particular article or type of electrically conducting film, it has to date proven valuable in connection with transparent electrically conductive films of tin oxide on glass sheets and it will be specifically described in that connection here.

Glass sheets coated with transparent electrically conducting films of tin oxide such as set forth in Patent No. 2,429,420 to H. A. McMaster dated October 21, 1947, have been used for many applications such as aircraft and automotive windows. Films of this type are applied by first heating the glass sheets to substantially their point of softening and then spraying one surface of the hot glass with a tin halide in fluid form.

In use, the electrically conducting film on the glass sheet is supplied with electrical energy through suitable electrodes secured to the glass and in electrical contact with the film, to heat the glazing unit to a temperature at which ice or frost will be removed from, or its formation prevented on the surface of the exposed face of the unit. Because of present day automotive and aircraft styling, it is necessary to place the electrically conducting coatings on variously shaped windows having non-rectangular contours. As a result, it is sometimes necessary that the electrodes and the electrically conducting film be confined to certain areas of the glass sheets and in certain orientation with respect to one another so that the proper current pattern and uniformity of heating can be obtained over the electrically conducting film.

One reason for this is that it has been considered that an electrically conducting film could only be successfully used for this purpose when it was substantially rectangular in shape. This was because with de-icing units of the above character, electrodes are conventionally provided which extend along the length of the marginal portions that are adjacent two opposite edges of the film glass sheet and, with uniform thickness of film, it is necessary that the electrodes be equidistant from one another throughout their length in order to produce a uniform temperature over the area of the film upon application of the required amount of electrical energy to the electrodes.

In situations where the electrodes are not spaced equidistantly from one another throughout their length, objectionable non-uniform heating of the glass results because the electrical energy seeks the shortest path from electrode to electrode through the film and thus creates overheated areas where the electrodes are closest together and relatively cool areas where the electrodes are farthest apart. Consequently, de-icing units in which the electrodes are arranged along opposite margins of the filmed glass surface have proved unsatisfactory for the purpose when the glass surface was non-rectangular in shape.

To properly locate the electrically conducting film on a given shape of glass sheet, it has been found desirable in many cases to first coat the entire window or lite with the conducting film and then to remove portions of the film along selected areas so that a film shape calculated to give the proper current path will be obtained.

For example, as indicated above, this situation may exist where the sheet being coated has angularly disposed sides or where the ends of the sheet are rounded or curved. Due to the conditions of operation i. e., heat and spraying, etc., it is difficult in applying a coating to such a sheet to locate it exactly and to accurately limit the disposition of the conducting film to the very precise area contours or shapes required by the various current and electrical heat patterns desired. Instead, it has been found to be more practical to deposit the electrically conducting film over the whole sheet and to then remove the portion of the film not desired by one of the well known deleting procedures. One way in which this can be done is by using a solution of hydrochloric acid and zinc, or other solution, which completely removes the tin oxide coating on the areas contacted by the solution.

In order to accurately confine the deleting of the electrically conducting film to the desired areas on the glass sheet, and to prevent the deleting materials from acting on the remainder of the film, it is necessary to mask the portions of the film that it is desired to retain on the glass surface.

Heretofore, the preferred method of masking the film was by the use of various types of masking tape. However, this adds an additional step to the filming and deleting procedure. It is also extremely expensive. Thus, the tape cost alone in masking, say, 100,000 units per year, amounts to a large dollar volume in material cost. In addition a high labor cost is involved in cutting the tape to the desired contours and shapes, and in arranging and fixing the tape on the units.

It is a primary aim of the present invention to eliminate this very costly masking step in the filming and deleting procedure by combining the masking step with another necessary step in the complete method, which is the step of protecting the filmed glass sheet during handling, edge grinding, storage, and other procedures incident, to the processing and installation of the units after filming.

Another important advantage of the invention is the fact that it utilizes the means for protecting the filmed glass, and which is already available, for masking the portions of the film that are not to be deleted.

Thus, it is customary in this art to protect the filmed glass by providing a protective coating over the electrically conducting film on the glass. One coating which has been found to be exceptionally good for this purpose is an aqueous suspension of a caster oil plasticized, water insoluble, polyvinyl acetal or butyral resin of the type disclosed in Patents Nos. 2,487,254 and 2,487,255, issued to Paul L. Mahoney, November 8, 1949. Other similar types of resilient coatings can also be used. Such coatings are normally inert to the deleting agents such as the hydrochloric acid and zinc solutions described above, but as normally used would not necessarily prevent seepage of a liquid between the film and coating.

Briefly stated, the present invention contemplates accurately defining the line between the permanently filmed area of the coated glass and the areas to be deleted, by drawing a hot pointed stylus, iron, or similar tool over and along the protective coating to outline the desired filmed areas. We have discovered that this will also serve to firmly adhere the coating to the conductive film and/or to the glass along a neat line of demarcation and will effectively seal the deleting liquid from the areas where it is desired that the electrical film be retained. At the same time it permits the protective coating on the areas that are to be deleted to be readily removed therefrom.

It is therefore a primary object of the invention to provide a method of protecting portions of an electrically conducting film from a solution which is to be used to remove another portion of said film.

Another object of the invention is to provide a method of obtaining a firm line of adherence of a protective coating to an electrically conducting film along a line along which a portion of the electrically conducting film is to be removed.

A further object of the invention is to provide a method of protecting portions of electrically conductive films on lites from acid solutions and the like which are used to remove other portions of said film without the use of masking tapes or the like.

A still further object of the invention is to provide a method of firmly securing a protective coating such as polyvinyl acetal or butyral resin to an electrically conducting film or support plate such that a portion of the protective coating adjacent the firmly secured area may be removed in an even and precise manner.

Other objects and advantages of the invention will become more apparent during the course of the following description when taken in connection with the accompanying drawings.

In the drawings, wherein like numerals are employed to designate like parts throughout the same:

Fig. 1 is a perspective view of an irregularly shaped lite of glass provided with an electrically conducting film in accordance with the invention;

Fig. 2 is a schematic view of the spraying of the lite with a protective coating over the electrically conductive film thereon;

Fig. 3 illustrates a manner in which the protective coating may be firmly secured or bonded to the lite according to the invention;

Fig. 4 is a fragmentary sectional view of a lite showing the protective coating removed from a portion of the electrically conducting film;

Fig. 5 is a fragmentary sectional view of the lite showing the lite after the deletion of a portion of an electrically conducting film and the protective coating has been completed; and Fig. 6 is a fragmentary sectional view of the completed lite shown in Fig. 1 taken substantially along lines 6—6 of Fig. 1.

Referring now more particularly to the drawings, there is shown in Fig. 1 one representative lite or window 10 with which this invention is concerned. That is, a window or windshield having a non-rectangular shape. It will, of course, be understood that the invention is equally applicable to curved shapes, triangular shapes, trapezoidal shapes and others.

As noted previously, in heating windows or windshields which have an electrically conducting coating thereon and which are non-rectangular in shape, a problem exists with regard to the current path through the electrically conducting film when the film is placed on odd shaped windows. Consequently, it is necessary to place the electrically conducting film in certain patterns on such sheets so as to offer the proper current path when power is applied to the film. As shown in Fig. 1, the lite or windshield 10 is formed of a glass sheet 11 having two parallel sides 12 and 13, a bottom edge 14 at right angles thereto, and an upper edge 15 angularly disposed with respect to the bottom edge 14.

In making an electrically conducting article of this type, there is applied an electrically conducting film, preferably, a transparent, electrically conducting film of tin oxide 16 to one side of a sheet of glass 11. In applying the electrically conducting coating or film of tin oxide 16 to one surface of the sheet 11, the sheet is first heated to substantially the softening point of the glass, after which, a solution of an electrically conducting film forming liquid, such as a tin compound in a suitable solvent, is sprayed on the heated surface of the sheet to produce the electrically conducting film 16.

In order to supply power to the electrically conducting film 16, so that the unit may be used as a de-icing windshield or the like, it is necessary that electrodes be provided in contact with the electrically conducting film such as indicated at 17 and 18 in Fig. 1. These electrodes may be of any one of a number of different materials, and can be applied in any convenient manner. For example, electrodes of sprayed copper, sprayed copper alloys, baked-on gold, silver and platinum fluxes and combinations of these materials have all been used satisfactorily.

Following the application of the electrically conducting film and the electrodes, there is conventionally applied a protective coating 19 over the entire electrically conductive film and electrodes to protect the film during handling, edge grinding, storage, etc., so that they will not be scratched or marred thus causing the unit to become defective and burn out when power is applied to it. This coating, as noted above, may in accordance with the invention be of a castor oil plasticized water insoluble polyvinyl acetal or polyvinyl butyral resin, or it may be of other thermoplastic or thermosetting plastics that can be further cured or sealed to the glass by the application of heat as will be described hereinbelow.

A spray gun 20 may be used to spray the entire sheet with a solution of the protective coating material as shown in Fig. 2. The protective coating 19 thus placed on the unit is then allowed to dry in air at around room temperature to allow the coating to set and to adhere to the unit.

As pointed out above, it is proposed according to the invention to treat this protective coating in a manner to make it serve the dual purpose of masking as well as mechanically protecting the film. To this end, upon drying, the filmed and coated sheet is placed upon a suitable table 21 as shown in Fig. 3, and a template 22 is placed over the protective coating in the area of the electrically conducting film that is to be deleted. At this point, to form a sharp demarcation line along which the unneeded portion of the coating 19 may be removed and also to firmly adhere and secure the edge of the remaining protective coating to the film or sheet along the area of the demarcation line, a heated sharp pointed scribe or stylus 23 is drawn along the edge 24 of the template which is of the contour of the demarcation line. This drawing of the sharp heated tool along and over the protective coating with a medium amount of pressure causes the protective coating 19 to cure and to more tightly adhere to the electrically conducting film 16 along the depressed area 25 (Figs. 4 and 5) formed by the scribe.

In fact a secure, acid tight bond is formed between the coating and film all along the demarcation line 25, and it has been found that the protective coating 19 may then be torn or peeled away from the remainder of the protective coating adjacent the demarcation line and that the coating under the said demarcation line will be so tightly and strongly bonded and adhered to the glass or the electrically conducting film that it will not be disturbed by the tearing action. This bond formed underneath the demarcation line between the electrically conducting film or the glass and the protective coating is sufficiently strong and tight to prevent the acid of the deletion solution from seeping under the film and causing any uneven or spotty deletion of the conducting film 16 which would result in hot spots that tend to burn out the film when a current is passed therethrough.

After the protective coating 19 has been removed from the area of the conducting film to be deleted and along the demarcation line 25, the beforementioned deletion solution, which may preferably be a solution of hydrochloric acid and zinc, is placed over the area of the electrically conducting film indicated at 26 in Fig. 4. This solution reacts with the tin oxide or electrically conductive film to remove the film from the glass sheet and is subsequently washed away with water to remove the acid and conductive film components. However, since the acid does not react with the protective coating over the remainder of the film, the electrically conducting film thereunder is not acted upon and this portion of the film remains on the sheet 11 as shown in Fig. 5. The remaining protective coating 19 over the electrically conducting film, when allowed to remain on the film during shipping and installation, acts to prevent any possible marring or scratching during that time.

While the invention has been discussed in connection with sheets having substantially angularly disposed straight sides, it will be apparent that the principles of the invention may be practiced with sheets having other contours such as circular contours, triangular contours, curved and arcuately shaped contours, etc. Also, the principles of the invention may be practiced with electrically conductive films other than the tin oxide film described.

It is to be understood that the form of the invention disclosed herein is to be taken as the preferred embodiment and that various changes in the shape, size and arrangement of parts may be resorted to without departing from the spirit of the invention or the scope of the following claims.

We claim:

1. A method of deleting film from a filmed surface which comprises applying a protective coating over said film, additionally heat sealing the protective coating to said film along a demarcation line, removing a portion of said protective coating from one side of said demarcation line to expose a portion of said film, and removing the exposed portion of the film.

2. A method of deleting film from a filmed surface as claimed in claim 1, in which a heat source is drawn across said protective coating to more firmly adhere and seal said coating to said article and said film along said demarcation line.

3. A method of deleting film from a filmed surface as claimed in claim 1, wherein the said protective coating is a film of an aqueous suspension of a castor oil plasticized water insoluble polyvinyl acetal resin.

4. A method of deleting film from a filmed surface as claimed in claim 1, wherein said protective coating is formed of an aqueous suspension of a castor oil plasticized water insoluble polyvinyl butyral resin.

5. A method of deleting film from a filmed surface as claimed in claim 1, in which the film is formed of a tin compound.

6. A method of deleting film from a filmed surface as claimed in claim 1, in which a portion of said film is removed by a solution of a mixture comprising metal more electro-positive than tin in pulverulent form and a water binder which is mixed with an aqueous non-oxidizing acid.

7. A method of deleting film from a filmed surface as claimed in claim 6, in which said solution which reacts with said tin oxide film is formed of hydrochloric acid and zinc.

8. A method of removing electrically conductive film from a surface of a support body which comprises applying a protective coating over said film which is adherent to said film, further heat sealing the protective coating to said electrically conductive film along a demarcation line along which a portion of said protective coating is to be removed, removing a portion of said protective coating adjacent said seal and demarcation line to expose a portion of said electrically conducting film to be deleted, and removing said electrically conductive film except from the area covered by said protective film by the application of a solution which reacts with said electrically conductive film to place it in solution.

9. A method of locating an electrically conducting film of tin oxide on an area of a vitreous surface according to a definite predetermined pattern, comprising applying said film to said surface over and beyond said pattern area, applying a protective coating of a material inert to a solution which will dissolve the tin oxide film and which is sealable thereto by heat, heating said coating along the line of demarcation between said pattern area and an area therebeyond to seal said coating to said film, removing a portion of said protective coating lying on the side of said demarcation line beyond said pattern area to expose a portion of said electrically conducting film, then removing the exposed portion of the film by application of a solution which will dissolve the film and finally removing said solution with the dissolved film.

10. A method of placing an electrically conductive film on articles according to a definite pattern, comprising applying an electrically conductive film over a general area on an article, placing a protective coating generally over said electrically conductive film, said protective coating being heat sealable and resistant to a solution used to react with and place said electrically conductive film in solution when in contact therewith, heat sealing the protective coating to said electrically conductive film and said article along a demarcation line along which a portion of said protective coating is to be removed, removing a portion of said protective coating adjacent said sealed demarcation line to expose a portion of said electrically conductive film to be deleted, and removing said conductive film by the application of a solution which reacts with said film to place it in solution and which has substantially no effect upon said protective coating.

References Cited in the file of this patent

UNITED STATES PATENTS

| | | |
|---|---|---|
| 2,346,231 | Ormond | Apr. 11, 1944 |
| 2,487,254 | Mahoney | Nov. 8, 1949 |
| 2,487,255 | Mahoney | Nov. 8, 1949 |
| 2,557,983 | Linder | June 26, 1951 |
| 2,559,969 | Kennedy | July 10, 1951 |
| 2,606,566 | Tarnopol | Aug. 12, 1952 |
| 2,648,752 | Saunders | Aug. 11, 1953 |